J. F. FROMM.
MOTOR VEHICLE.
APPLICATION FILED MAY 28, 1915.
1,191,295.
Patented July 18, 1916.
3 SHEETS—SHEET 1.
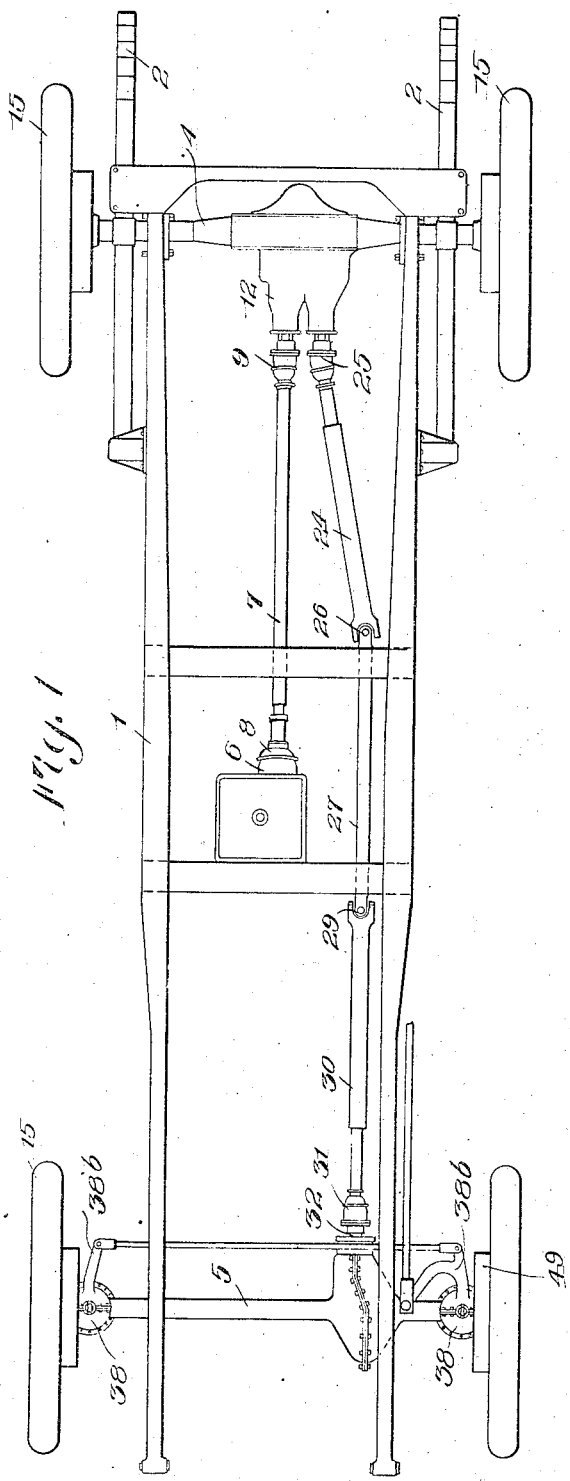
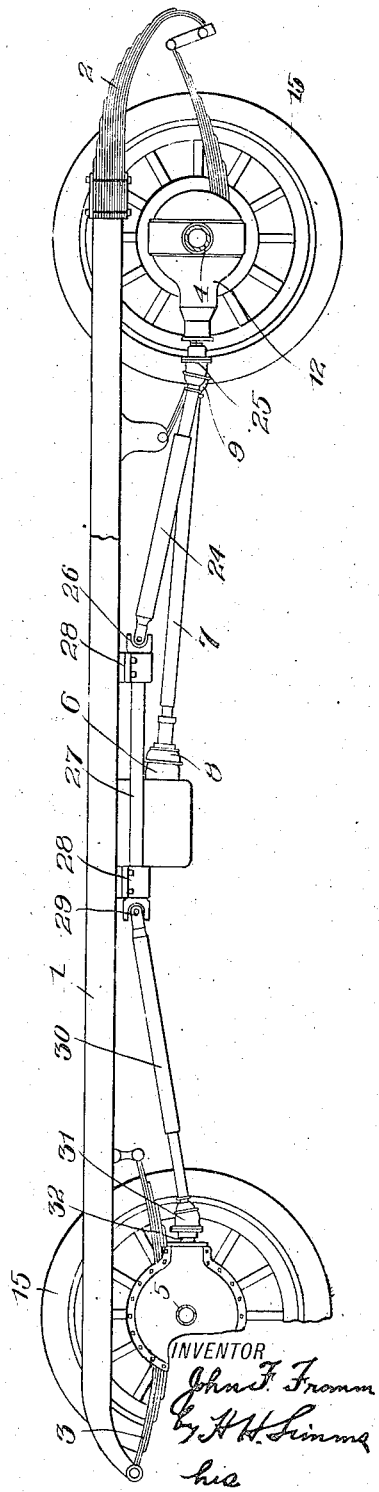
INVENTOR
John F. Fromm
By H. H. Simms
his
ATTORNEY

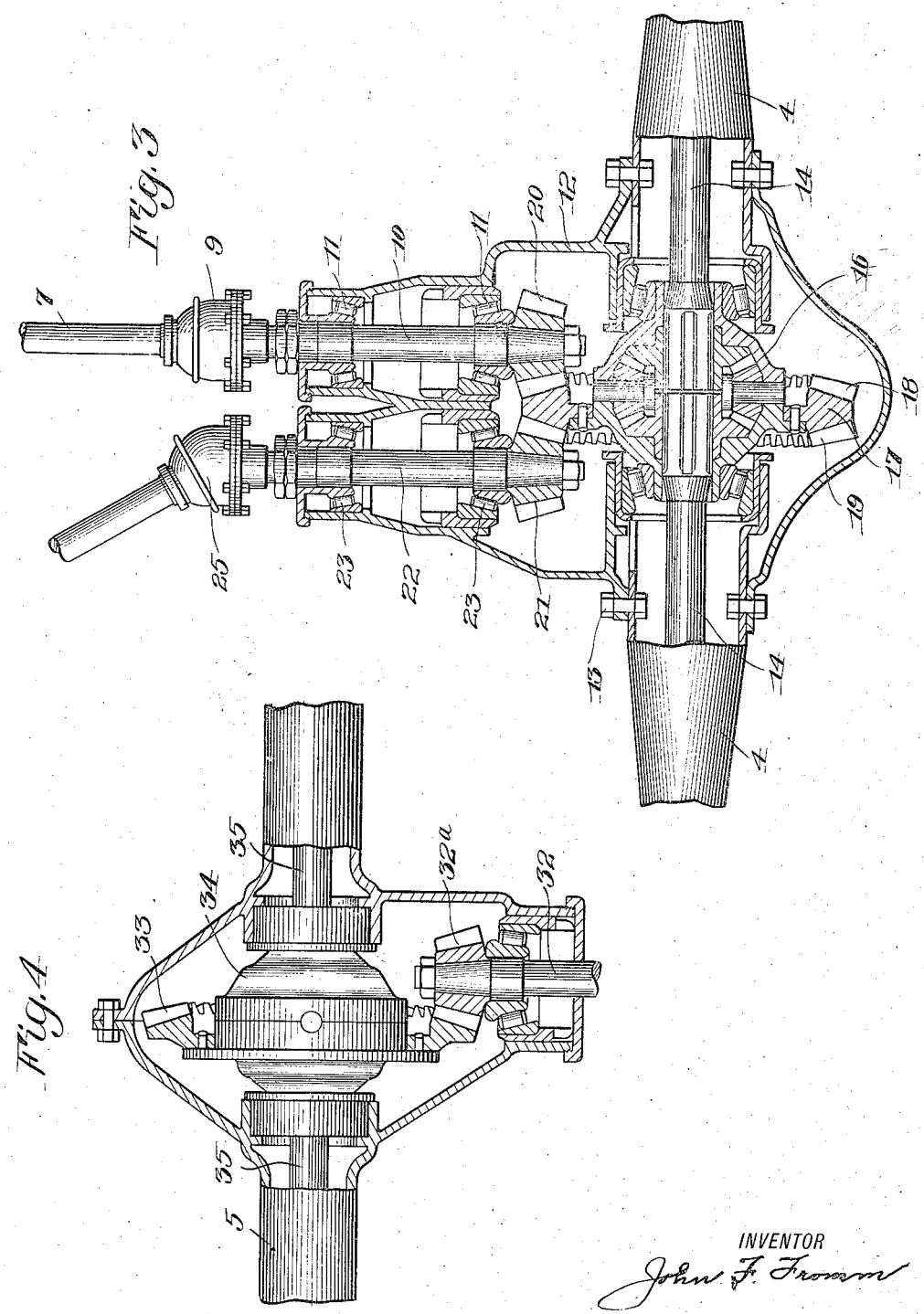

J. F. FROMM.
MOTOR VEHICLE.
APPLICATION FILED MAY 28, 1915.
1,191,295.
Patented July 18, 1916.
3 SHEETS—SHEET 3.
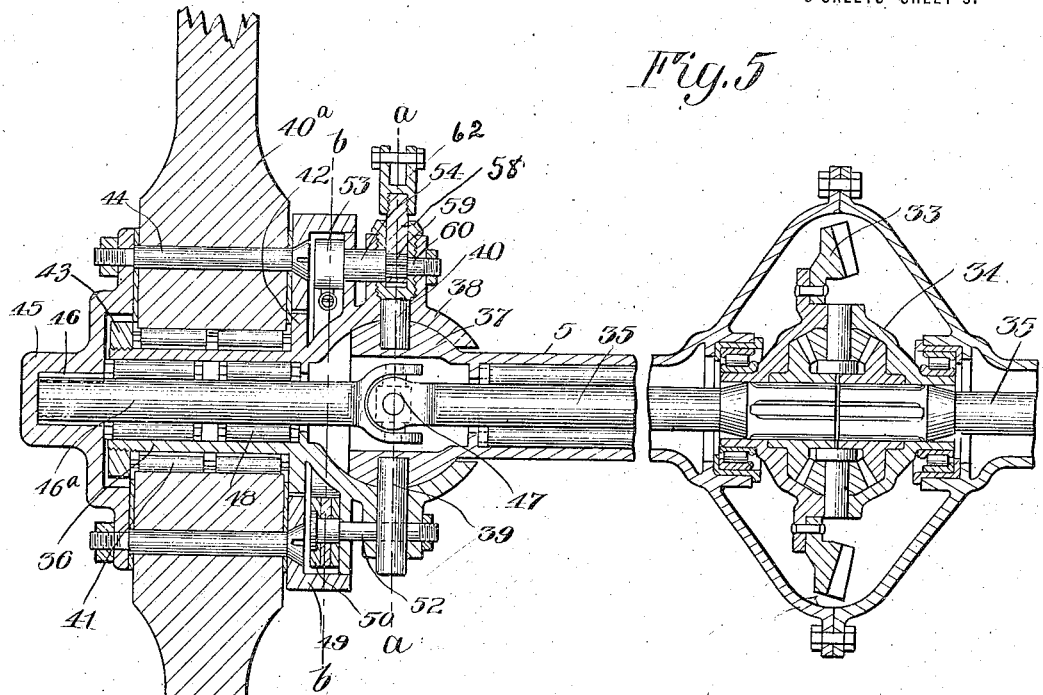
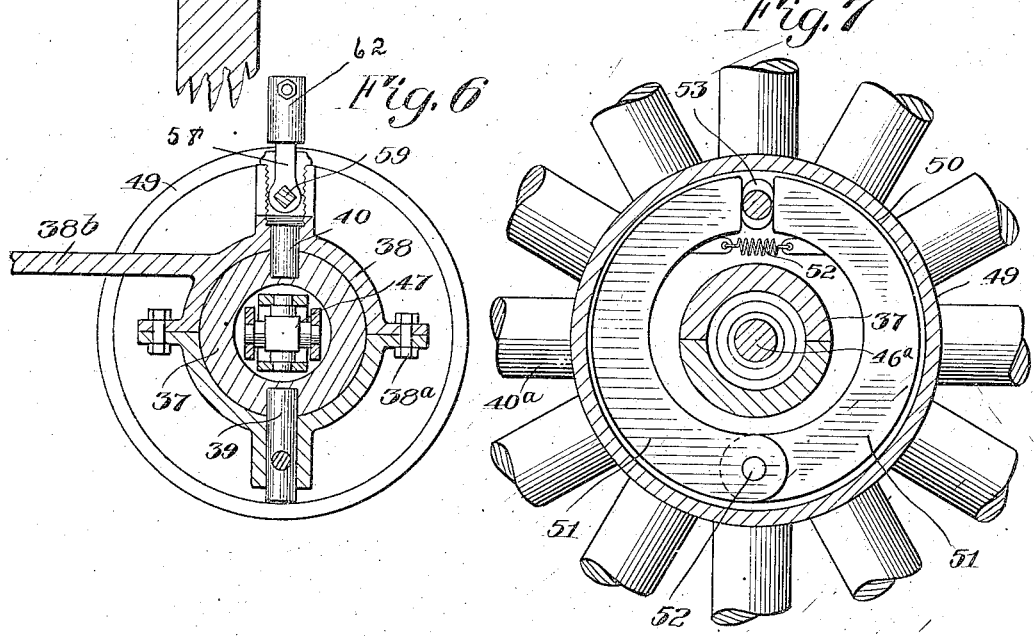
INVENTOR
John F. Fromm
BY
H. H. Simms
his ATTORNEY.

UNITED STATES PATENT OFFICE.

JOHN F. FROMM, OF ROCHESTER, NEW YORK.

MOTOR-VEHICLE.

1,191,295.     Specification of Letters Patent.     Patented July 18, 1916.

Application filed May 28, 1915. Serial No. 30,954.

*To all whom it may concern:*

Be it known that I, JOHN F. FROMM, of Rochester, in the county of Monroe and State of New York, have invented a new and useful Motor-Vehicle, fully set forth in the following specification and shown in the accompanying drawings.

The present invention relates to motor vehicles and more particularly to the type which employs both a front and a rear drive, an object of this invention being to provide a construction which will effectively drive both the front and the rear wheels and which will be simple in operation and durable in use.

To these and other ends, the invention consists in certain parts and combinations of parts all of which will be hereinafter described, the novel features being pointed out in the appended claims.

In the drawings: Figure 1 is a plan view of a chassis with my invention embodied therein; Fig. 2 is a side view with portions removed; Fig. 3 is a horizontal section through the rear differential; Fig. 4 is a horizontal section through the front differential; Fig. 5 is an axial section of a portion of the front axle and one of the wheels; Fig. 6 is a vertical section on the line $a$—$a$, Fig. 5; and Fig. 7 is a vertical section on the line $b$—$b$, Fig. 5.

Referring more particularly to the drawings, 1 indicates the frame which is supported by springs 2 and 3 on the rear axle housing 4 and the front axle housing 5. The frame 1 supports the usual motor and to the shaft 6 of the latter a telescopic shaft 7 is connected by a ball joint 8, the shaft 7 also being connected by a ball joint 9 to a stub shaft 10, and the ball joint being inclosed within a suitable housing. The stub shaft 10 turns in bearings 11 in a casing member 12 which projects from and is removably bolted at 13 to the housing 4 of the front axle.

The axle housing 4 contains the usual axle sections 14 which have wheels 15 connected to their outer ends and have their inner ends connected by a differential gearing 16, the latter being preferably of any known form except that its driving member 17 is formed with two crown gear portions 18 and 19 on its opposite sides. With the crown gear portion 18, a beveled gear 20 on the shaft 10 is arranged to mesh while the other gear portion 19 is connected with the front axle to drive the front wheels. The connection between the rear differential and the front wheels, in this instance, embodies a beveled gear 21 arranged on the stub shaft 22 which turns on bearings 23 within the casing 12, said shaft 22 being parallel with the shaft 10. To the outer end of the shaft 22, a telescopic shaft 24 is connected preferably by a universal or knuckle joint 25 arranged within a suitable housing. The other end of the telescopic shaft 24 is connected by a knuckle joint 26 to a shaft 27 which is journaled at 28 to the under side of the frame 1. This shaft 27 is connected by a knuckle joint 29 to another telescopic shaft 30, which, in turn, is connected by a knuckle joint 31 to a shaft 32 which is journaled in the front axle housing 5 and carries a beveled gear $32^a$ meshing with the drive gear 33 of the front differential 34, which connects the two axle sections 35 that turn in the axle housing 5.

The housing 5 carries at opposite ends tubular bearing members or spindles 36 which are mounted to swing about vertical axes on the housing 5. In this instance, the housing 5 has a spherical or ball enlargement 37 at each end which is fitted within a spherical pocket member 38 formed on one of the spindles 36 and having a removable section secured by bolts $38^a$ to permit the spindle to be fitted to the ball of the axle housing. To hold the spindle to the axle housing so that the spindle may turn about a vertical axis, two alined pivot or bearing pins 39 and 40 are provided, these pivot pins being removably held in place by means to be hereinafter described. An arm $38^b$ extends from the pocket member 38 and serves for steering the wheel in the usual manner.

Upon each of the spindles 36, a wheel $40^a$ turns, roller bearings 41 being interposed between the spindle and the wheel, and the wheel being held against an annular flange 42 on the spindle by a nut 43. Removably secured to the outer face of the wheel $40^a$, by bolts 44 extending through the wheel, is a cap 45 which is provided with a pocket on its inner face. Within this pocket, a key 46 is arranged which fits within a groove formed in a stub axle $46^a$. This stub axle extends through the hollow spindle 36 and is connected to the axle section 35 by a knuckle joint 47 which is in direct line with the bearing pins 39 and 40 between the hollow spindle 36 and the axle casing 5, roller bearings 48 being interposed between the stub axle 46ª and the interior of the hollow spindle 36.

The braking means for the front wheels embodies an annulus 49 having an interior annular braking surface 50 for engagement by two segmental braking members or shoes 51 which are pivoted on a bolt 52 that also extends through the flange 55 and a pivot pin 39 to hold the latter in position. Normally, these braking members are held out of braking position by a spring 52 which draws their swinging ends together. For operating the braking members into coöperation with the annular braking surface 50, an elongated cam member 53 is rotatably mounted between the swinging ends of the segmental braking members 51. This cam member is mounted on the shaft 54 which extends through the flange 55 and transversely through an internally threaded bifurcated boss 56 in which an externally threaded bifurcated portion 57 on the pivot pin 40 is arranged. The portion 57 of the pivot pin is provided with a pocket for receiving a lever 58 which is provided with a transverse bore of rectangular cross section for receiving a squared portion 59 on the shaft 54 so that the latter holds the pivot pin 40 against turning and also holds the lever 58 to the swinging spindle 36. The squared portion 59 is reduced with relation to the main portion of the shaft 54 and the extreme end 60 of the shaft is reduced with relation to the squared portion and has screw threads engaged by a nut 61 which holds the shaft in position. On the end of the lever 58, a cap 62 is loosely turnable and this cap has a bifurcated portion to which a brake rod is secured.

In operation, the power from the motor is transmitted to the rear differential by the telescopic shaft 7 and the stud shaft 10. From the drive member 17 of the rear differential, power is transmitted to the front differential by means of stud shaft 22, telescopic shaft 24, shaft 27, telescopic shaft 30, and stub shaft 32. The front axle transmits the power to the stub shafts 46ª which connect with the front wheels. By this arrangement, the front and rear wheels are both driven from the same motor while the front wheels are permitted to swing to steer the vehicle. The universal joint and the front axle sections are entirely inclosed. The swinging stub shafts at the ends of the axle are connected to the wheels in such a manner that the wheels may be readily removed. The front wheels may also be braked in any angular position with relation to the front axle. This braking means is mounted in a novel manner and also serves to hold the pivot pins of the swinging hollow spindles.

The mechanism as a whole is inclosed and is simple in construction, its parts being so made and arranged that they are not liable to get out of order.

No claim is herein made to the mounting of the front steering wheels or to the braking mechanism therefor as these parts form the subject matter of a divisional application filed January 7, 1916, Serial No. 70,780.

What I claim as my invention and desire to secure by Letters Patent is:

1. In combination in a motor driven vehicle, divided front and rear drive axles each provided with a differential gearing between its sections, a motor connected to the drive gear of one of said differential gearings, and driving connection extending from said drive gear to the drive gear of the other differential gearing.

2. In combination with an axle housing, a divided axle supported therein, a differential gearing between the sections of the axle having crown gears on opposite sides of the driving member thereof, stub shafts journaled in the axle housing and having gears meshing with the crown gears and two other shafts, one a drive shaft and the other a driven shaft, each having a knuckle joint connection with one of the stub shafts.

3. In combination in a motor vehicle, divided rear and front drive axles, each provided with a differential gearing between its sections, a motor connected to the drive gear of one of said differential gearings, and driving connection from said drive gear to the drive gear of the other differential gearing, said connection embodying a shaft secured to the frame, stub shafts on the axle housings geared to drive gears of the differential gearings, and telescopic shafts having universal joint connection with the stub shafts and the shaft on the frame of the vehicle.

JOHN F. FROMM.